(No Model.)
G. W. WEBER.
FOLDING HINGED HANDLE FOR VESSELS.
No. 550,429. Patented Nov. 26, 1895.
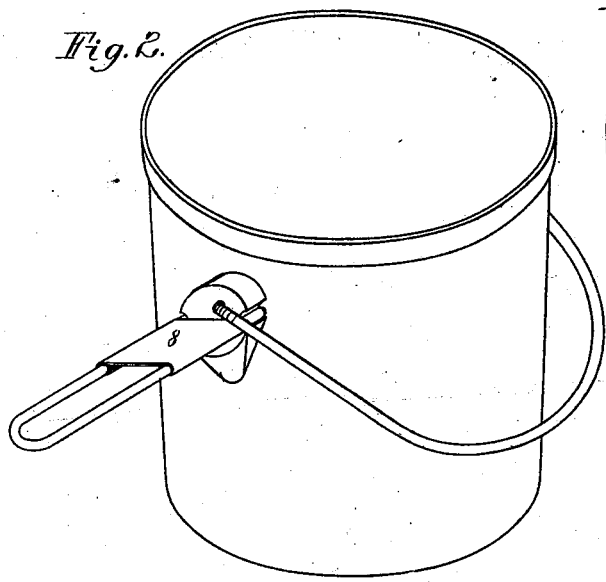
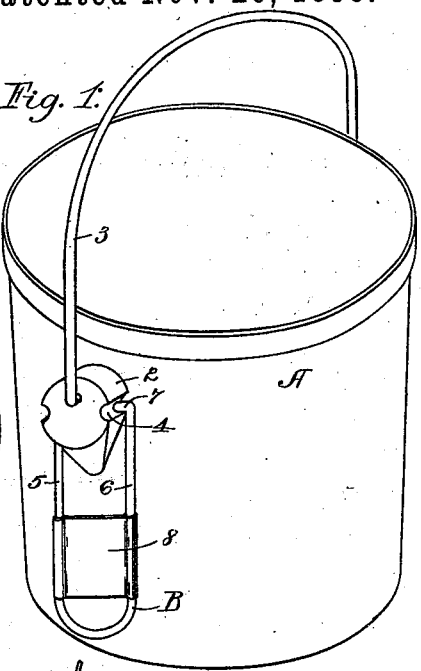
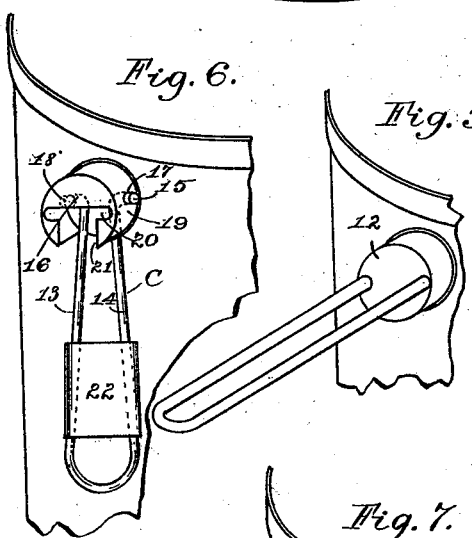
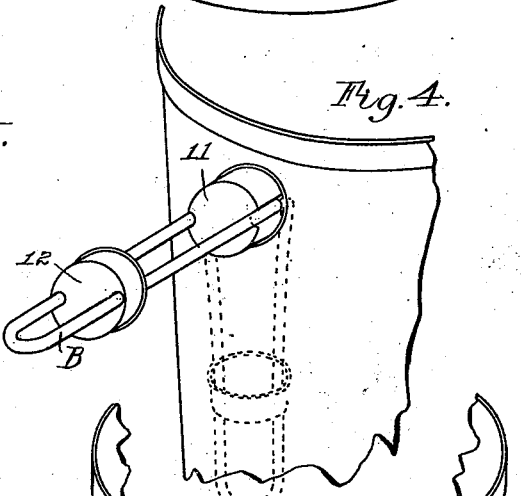
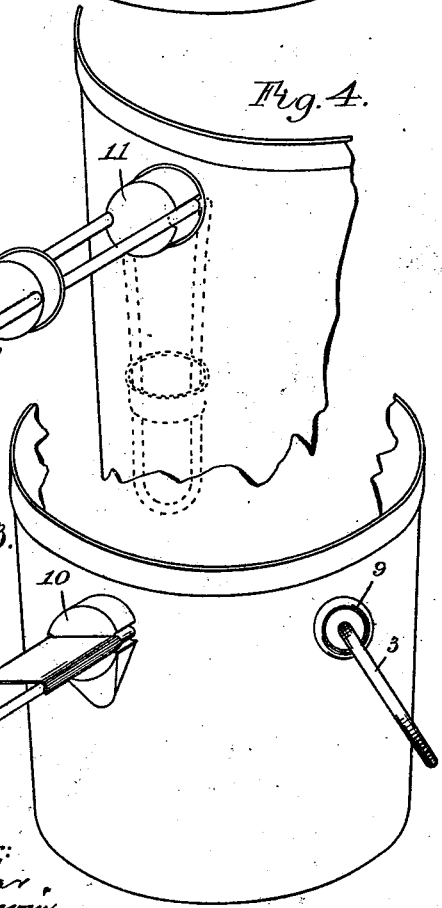
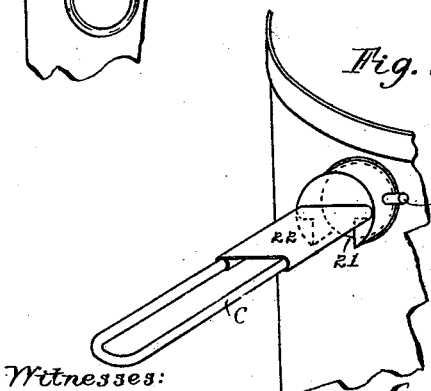
Witnesses:
F. G. Bradbury.
A. S. Johnson.
Inventor:
Geo. W. Weber,
per: F. B. Murwin
Attorney.
ANDREW B.GRAHAM PHOTO-LITHO.WASHINGTON,D.C.

UNITED STATES PATENT OFFICE.

GEORGE W. WEBER, OF ST. PAUL, MINNESOTA.

FOLDING HINGED HANDLE FOR VESSELS.

SPECIFICATION forming part of Letters Patent No. 550,429, dated November 26, 1895.

Application filed March 21, 1895. Serial No. 542,593. (No model.)

*To all whom it may concern:*

Be it known that I, GEORGE W. WEBER, of St. Paul, Ramsey county, Minnesota, have invented certain Improvements in Folding Hinged Handles for Vessels, of which the following is a specification.

My invention relates to improved attachments for sheet-metal pails and similar vessels, its object being to provide a supplementary handle for lard-pails and similar vessels by means of which the vessel when emptied of its original contents can be used as a cooking vessel more conveniently than when fitted with a bail only.

To this end my invention consists in providing an ear or clip to which the bail is preferably attached, and to which, also, is hinged a supplementary handle. This handle, when turned to a horizontal position, engages notches or other supporting means upon the ear, and may be further secured in that position by a locking device, so as to fix it firmly in such position. The vessel can then be easily emptied by means of this handle. In shipping the pails or when it is not desired to use the supplementary handle the locking device can be freed and the handle folded downward against the side of the pail.

My invention further consists in the specific construction and combination hereinafter more particularly set forth, and pointed out in the claims.

In the accompanying drawings, forming part of this specification, Figure 1 is a perspective view of a pail fitted with my improved supplementary handle, the handle being shown in folded or downturned position. Fig. 2 is a similar view of the utensil with the bail turned downward and the supplementary handle secured in a horizontal position. Fig. 3 is a modified form in which the bail-ear is independent of the clip to which the supplementary handle is secured. Fig. 4 is a detail of another modified form, in which the supplementary handle is fitted with a different locking device, the locking device being shown slipped back from the pail. Fig. 5 is another detail showing the locking device in engagement with the clip upon the pail in locking position. Fig. 6 is a detail of another form of handle, the handle being shown in folded or downturned position; and Fig. 7 is another detail of the same construction, the handle being locked in horizontal position ready for use.

In the drawings, A represents an ordinary pail, such as the lard-pail of commerce, provided with the ear 2, to which is attached in the ordinary way the folding bail 3. This ear is provided on opposite sides with the similar horizontal grooves 4, at the rear end of each of which is a socket or opening.

B is a supplementary handle formed of wire bent to form the two parallel members 5 and 6. The tips 7 of these members are inturned toward each other at right angles with the members and enter the sockets or openings in the grooves 4. The shape of the handle is such that the spring of the wire tends to hold the tips 7 pressed closely inward, but allowing them to spring outward when the handle is turned downward, as shown in Fig. 1. When it is raised to horizontal position, as shown in Fig. 2, the spring of the wire forces the members into the grooves 4, thus supporting the handle. To further secure the handle in this position and absolutely prevent the members being spread to free them from the grooves, I provide a slide 8, made preferably of sheet metal, and bridging the space between the members with the ends looped around the members and sliding thereon. The members are preferably not exactly parallel with each other normally, but slightly diverge from each other toward the ends, so that the slide 8 will close the members together and hold them in the grooves, and when slipped back will separate the members sufficiently to allow the handle to drop against the side of the pail.

In the modified construction shown in Fig. 3 the bail 3 is shown attached to the independent ear 9 in the ordinary manner, and a clip or ear 10 serves as the connection and support for the supplementary handle in the same manner as the ear 2 shown in Figs. 1 and 2.

In the modified construction shown in Figs. 4 and 5 the ear 11 is preferably cylindrical in form, and the handle B fitted thereto is provided with a cylindrical cap 12 sliding thereon and adapted to slip over and fit closely upon the ear 11 and thus to lock the handle in place, as shown in Fig. 5.

In the modified construction shown in Figs. 6 and 7 the handle C is made substantially in the form of the handle B, excepting that the members 14 and 13 have their tips 15 and 16 outturned and extend through openings 17 and 18 in the sides of the ear 19. The outer face or end of the ear 19 has a horizontal slot 20, and the under part cut away to form a narrower notch 21. The handle is fitted with a slide 22 of the same general form as the slide 8, which when slipped back in the position shown in Fig. 6 springs the members of the handle together or permits them to spring of their own resiliency sufficiently to drop downward and swing in the notch 21; but when the handle is raised and the slide slipped forward, as shown in Fig. 7, the members are expanded to lie in the ends of the slot 20 and are thus locked as securely in place as in the other constructions shown.

I claim—

1. In a pail, the combination of the ear or clip, the folding handle hinged thereto and the interlocking attachment slidable upon said handle.

2. In a pail, the combination of the ear having bail sockets and lateral openings or sockets, the folding handle fitted to and turning in said lateral sockets, and the interlocking attachment slidable upon said handle and adapted to engage said clip.

3. The combination with the pail, of the bail ear therefor having sockets to receive a supplementary folding hinged handle, and means for locking said handle in said sockets.

4. The combination with the pail, its bail and the supplementary handle, of the clip socketed to receive said bail and having sockets or openings to receive said handle, and a locking device for said handle adapted to secure it in substantially horizontal position.

5. The combination with the pail, of the socketed bail ear therefor, a supplementary handle having laterally projecting points fitted to the sockets in said ear and serving as gudgeons, and means for locking said handle in place.

6. The combination with the pail and the ear attached thereto, of the supplementary handle hinged to said ear and adapted to fold against the side of the pail and means for locking it in raised position.

7. In combination with a vessel of the class described, a clip secured thereon, a folding handle hinged to said clip, the slide upon said handle adapted when moved toward said vessel to hold said handle locked in horizontal position, and when withdrawn allowing the handle to be folded against the side of the vessel.

8. In combination with a vessel of the class described, the clip thereon having sockets or openings in the opposite sides thereof, the grooves or notches in the horizontal plane with said openings, the supplementary wire handle having laterally turned points to fit into said sockets, the ends of the handle adapted by their own resiliency to spring into said notches or grooves so as to be held in horizontal position, and the means for holding said handle from disengagement with said grooves.

9. In combination with a vessel of the class described, the clip secured thereon having sockets or openings in the opposite sides thereof, the grooves or notches in the horizontal plane with said sockets or openings, the supplementary handle consisting of a wire bent upon itself to form two members and having laterally turned points to fit to said sockets, and adapted by their own resiliency to spring into said notches or grooves so as to be held in horizontal position, and the slide upon said handle for holding said members from disengagement with said grooves or notches.

In testimony whereof I affix my signature in presence of two witnesses.

GEORGE W. WEBER.

Witnesses:
 T. D. MERWIN,
 H. S. JOHNSON.